US007859594B2

(12) United States Patent
Komatsu

(10) Patent No.: US 7,859,594 B2
(45) Date of Patent: Dec. 28, 2010

(54) DISPLAY DRIVING SIGNAL PROCESSOR, DISPLAY APPARATUS AND A METHOD OF PROCESSING DISPLAY DRIVING SIGNAL

(75) Inventor: Hidetoshi Komatsu, Kanagawa (JP)

(73) Assignee: Sony Corporation (JP)

( * ) Notice: Subject to any disclaimer, the term of this patent is extended or adjusted under 35 U.S.C. 154(b) by 1084 days.

(21) Appl. No.: 11/595,700

(22) Filed: Nov. 9, 2006

(65) Prior Publication Data

US 2007/0109332 A1 May 17, 2007

(30) Foreign Application Priority Data

Nov. 11, 2005 (JP) ........................... P2005-327236

(51) Int. Cl.
*H04N 5/46* (2006.01)
*H04N 7/00* (2006.01)

(52) U.S. Cl. ....................... 348/558; 348/441; 348/443; 348/581

(58) Field of Classification Search ......... 348/552–555, 348/558, 441, 443, 445, 458, 384, 396, 399, 348/410, 581, 536, 790, 792–793, 474, 500, 348/521, 522, 540, 800, 582; 345/131–132, 345/115–116, 439, 213
See application file for complete search history.

(56) References Cited

U.S. PATENT DOCUMENTS

| | | | | |
|---|---|---|---|---|
| 5,841,430 | A * | 11/1998 | Kurikko | 345/213 |
| 6,023,262 | A | 2/2000 | Eglit | |
| 6,078,361 | A * | 6/2000 | Reddy | 348/558 |
| 6,157,376 | A * | 12/2000 | Eglit | 345/213 |
| 6,211,850 | B1 * | 4/2001 | Komatsu | 345/87 |
| 2002/0033900 | A1 | 3/2002 | Honma et al. | |

FOREIGN PATENT DOCUMENTS

| | | | |
|---|---|---|---|
| JP | 11-202839 | A | 7/1999 |
| JP | 2002-305752 | A | 10/2002 |

OTHER PUBLICATIONS

European Search Report, EP 06255715, mailed Aug. 27, 2009.

* cited by examiner

*Primary Examiner*—Trang U Tran
(74) *Attorney, Agent, or Firm*—Lerner, David, Littenberg, Krumholz & Mentlik, LLP

(57) ABSTRACT

Disclosed herein is a display driving signal processor and a display apparatus. A display driving signal processor includes: input means; number-of-horizontal pixels converting means; second clock generating means; and output means. A display apparatus includes: an image displaying portion; input means; number-of-horizontal pixels converting means; second clock generating means; and output means.

11 Claims, 6 Drawing Sheets

FIG. 3A TCLK (13.5MHz)

FIG. 3B INPUT VIDEO DATA

FIG. 3C DATA SIGNALS AFTER SIMPLE SCANING

FIG. 3D DATA SIGNALS AFTER SYNCHRONIZATION WITH HCK

FIG. 3E HCK1 (ONE PHASE)

FIG. 3F HCK1, HCK2 (TWO PHASES)

FIG. 3G DE

DISPLAY DRIVING SIGNAL PROCESSOR, DISPLAY APPARATUS AND A METHOD OF PROCESSING DISPLAY DRIVING SIGNAL

CROSS REFERENCE TO RELATED APPLICATIONS

The present invention contains subject matter related to Japanese Patent Application JP 2005-327236 filed in the Japanese Patent Office on Nov. 11, 2005, the entire contents of which being incorporated herein by reference.

BACKGROUND OF THE INVENTION

1. Field of the Invention

The present invention relates to a display driving signal processor for executing signal processing for displaying an image based on a video signal on an image displaying portion, and a method for use therein. Also, the invention relates to a display apparatus including such a display driving signal processor for displaying thereon an image.

2. Description of the Related Art

In recent years, the various kinds of display (image display) apparatuses or the like have been in a stage in which a display apparatus for executing signal processing for display driving by executing digital signal processing has come into wide use and has popularized.

Such a display apparatus operates to input/output a digital video signal, and a clock synchronized with the digital video signal in its inside through a data interface of a predetermined standard. The device inputted the digital video signal and the clock through the data interface, for example, executes necessary processing for the digital video signal in pixel unit at timing synchronous with the clock signal. Thus, the clock having a period corresponding to the pixel unit is also called a dot clock.

However, a frequency of the dot clock which is regulated by the data interface in the manner as described above does not necessarily become equal to that of the dot clock which is used in the pixel driving for the image display by the display device in the display apparatus. The reason for this is because the number of pixels (dots) in a horizontal direction (the number of horizontal pixels) which is determined in accordance with the dot clock or the like regulated in the data interface standard may be different from that which is constructionally set in the actual display panel. In other words, the number of horizontal pixels determined under the data interface standard is fixed as a certain number. On the other hand, the number of horizontal pixels of the display device becomes a number which, for example, should be changed in accordance with the screen size standard or the like. In such a manner, the number of horizontal pixels of the display panel has the variety. For this reason, the design idea for causing the number of horizontal pixels of the display panel to agree with that determined under the data interface standard is hardly adopted. In an actual case, the number of horizontal pixels of the digital video signal conforming to the data interface standard is converted into the number of horizontal pixels of the display device by executing processing called scaling. Also, the clock for display which is synchronized with the video signal in correspondence to the number of horizontal pixels obtained through this conversion is also generated by the scaling. The timing at which the pixels in the display device are driven is controlled in accordance with the clock for display. This leads to that the suitable display driving timing corresponding to the number of horizontal pixels of the display device is obtained. This technique, for example, is disclosed in Japanese Patent Laid-open No. Hei 11-202839.

SUMMARY OF THE INVENTION

Now, with regard to the structure for generating the clock for display as described above, one using a PLL circuit or the like has been known. However, the PLL circuit is a circuit having a properly large scale. Thus, the present structure in which the PLL circuit is added in order to generate the clock for display is not efficient from a viewpoint of substrate layout, a cost and the like.

Then, with respect to the number of horizontal pixels of the display device, it is possible to consider a circuit structure of selecting a number corresponding to a clock frequency that the frequency of the dot clock conforming to the data interface standard is multiplexed by power of two to be divisible without remainder. If such a structure is adopted, the clock supplied to the display device is obtained by executing simple processing for simply dividing the dot clock conforming to the data interface standard by power of two such as two or four. As a result, the PLL circuit becomes unnecessary.

However, in this case, the number of horizontal pixels of the display device is limited to one corresponding to the clock frequency meeting the above-mentioned condition. As a result, the degree of freedom for selection of the number of pixels of the display device is reduced, and thus there occurs the inconvenience that, for example, the variation of the products is limited.

In the light of the foregoing, the present invention has been made in order to solve the above-mentioned problems. According to one embodiment of the present invention, there is provided a display driving signal processor, including: input means for inputting video signal data having the predetermined number of first horizontal pixels, and a first clock having a given period and a predetermined frequency corresponding to the predetermined number of first horizontal pixels, the first clock being synchronized with the video signal data; and number-of-horizontal pixels converting means for converting the video signal data inputted by the input means from the number of first horizontal pixels to the number of second horizontal pixels adapted to the number of horizontal pixels which an image displaying portion has. The display driving signal processor further including: second clock generating means for generating a second clock in accordance with which an inversion interval is variably set based on a ratio of the number of first horizontal pixels to the number of second horizontal pixels, the second clock being to be synchronized with the video signal data after the number of first horizontal pixels is converted into the number of second horizontal pixels and having the inversion interval having a length which is an integral multiple of one period of the first clock; and output means for outputting data signals in accordance with the second clock and the video signal data after the number of first horizontal pixels is converted into the number of second horizontal pixels to the image displaying portion for displaying thereon an image by performing driving so as to scan pixels disposed in matrix at predetermined timing in horizontal and vertical directions, and writing data signals to the corresponding pixels at timing based on the second clock with respect to the horizontal pixel driving.

In addition, according to another aspect of the present invention, there is provided a display apparatus, including: an image displaying portion configured to display thereon an image by performing driving so as to scan pixels disposed in matrix at predetermined timing in horizontal and vertical directions, and writing data signals to the corresponding pixels at timing based on a second clock with respect to horizontal pixel driving; input means for inputting video signal data having the predetermined number of first horizontal pixels, and a first clock having a given period and a predetermined frequency corresponding to the predetermined number of first horizontal pixels, the first clock being synchronized with the video signal data; and number-of-horizontal pixels converting means for converting the video signal data inputted by the input means from the number of first horizontal pixels to the number of second horizontal pixels adapted to the number of horizontal pixels which an image displaying portion has. The display apparatus further including: second clock generating means for generating a second clock in accordance with which an inversion interval is variably set based on a ratio of the number of first horizontal pixels to the number of second horizontal pixels, the second clock being to be synchronized with the video signal data after the number of first horizontal pixels is converted into the number of second horizontal pixels and having the inversion interval having a length which is an integral multiple of one period of the first clock; and output means for outputting data signals in accordance with a second clock and the video signal data after the number of first horizontal pixels is converted into the number of second horizontal pixels to the image display portion.

With the configuration described above, firstly, and basically, the video signal data synchronized with the first clock is inputted, and the number of horizontal pixels of the video signal data is converted into the number of horizontal pixels of the image displaying portion. Here, the first clock is defined as having a predetermined frequency based on a given period. In addition, when the number of horizontal pixels is converted, the frequency of the clock able to be synchronized with the image signal data obtained after the conversion becomes different from that of the first clock. Thus, the second clock is generated as the clock which is to be synchronized with the video signal data obtained after the conversion. Then, the video signal data obtained after the conversion of the number of horizontal pixels, and the second clock are supplied to the image displaying portion in which the pixels are driven in the horizontal direction by utilizing a dot sequential system. The image displaying portion drives the pixels by utilizing the video signal data and the second clock thus supplied thereto as a clock for timing control for the horizontal driving, thereby displaying thereon the video signal data inputted thereto.

Under this condition, in the invention of this application, the inversion interval of the above-mentioned second clock has a length which is an integral multiple of one period (an integral number equal to or larger than one in the invention of this application, i.e., a natural number) of the first clock. Then, how many times of one period of the first clock the length for each inversion interval should be set may be changed in accordance with the ratio of the number of first horizontal pixels to the number of second horizontal pixels. The inversion time period of the second clock having such an inversion pattern is an integral multiple of one period of the first clock. Hence, for example, the second clock having such an inversion pattern can be generated by switching an output at an H/L level with the signal as the first clock as a basis irrespective of the ratio of the number of first horizontal pixels to the number of second horizontal pixels. Therefore, the second clock can be generated with a circuit which is structured in the form of a logical circuit or the like for inputting the first clock independently of the PLL circuit or the like.

In generating the second clock in the manner as described above, for example, since the structure of the PLL circuit has been unnecessary, the circuit for generating the second clock becomes simple. As a result, there is obtained an advantage that the circuit scale is reduced, which leads to the cost down as well.

In addition, in generating the second clock according to an embodiment of the present invention, there is especially no limit to what relationship is necessary for the ratio of the number of first horizontal pixels to the number of second horizontal pixels. In other words, in spite of omission of the PLL circuit or the like, this omission does not impede the degree of freedom for selection of the number of pixels of the display device.

The above and other features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
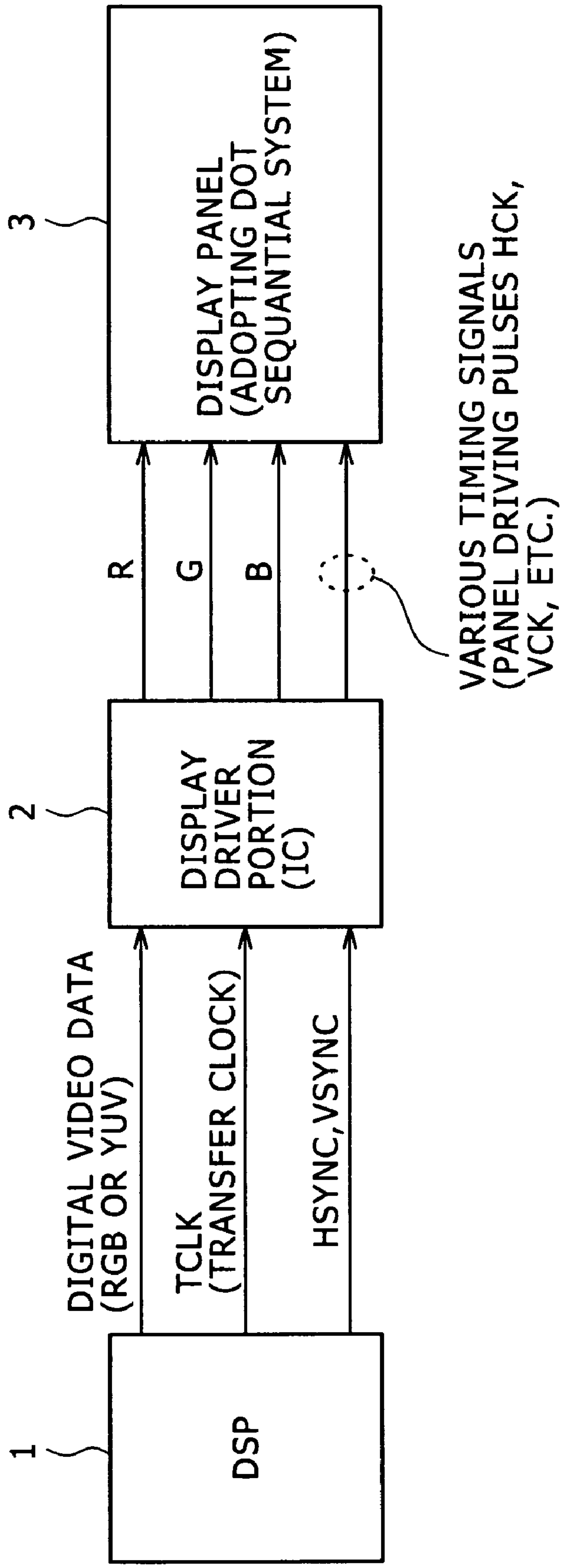
FIG. 1 is a block diagram showing an example of an overall configuration of a display panel driving system according to an embodiment of the present invention.

FIG. 1 shows an example of an overall configuration of a display panel driving system in a display apparatus according to an embodiment of the present invention. As shown in the figure, the display panel driving system, for example, includes a digital signal processor (DSP) 1, a display driver 2, and a display panel 3.

The DSP 1 is a circuit portion for subjecting video signals to the various kinds of necessary digital processing. As for outputs from the DSP 1, firstly, data signals including signal components of the three primary colors of R, G and B, or data signals including luminance signal components of Y, U and V or the like and color difference signal components are outputted as digital video data. In addition, the DSP 1 outputs a transfer clock TCLK (first clock) synchronized with the digital video data together with the digital video data. In this case, the DSP 1 also outputs a horizontal synchronous signal HSYNC and a vertical synchronous signal VSYNC corresponding to the digital video data.

The digital video signals, the transfer clock TCLK, and the horizontal and vertical synchronous signals HSYNC and VSYNC are outputted from the DSP 1 in the form conforming to a predetermined data interface standard for input/output of the digital video data and are inputted to the display driver portion 2 in a subsequent stage. Note that, the form in which the horizontal and vertical synchronous signals HSYNC and VSYNC are contained so as to be superimposed on the inputted or outputted digital video data is adopted in some cases depending on the data interface standard or the input/output device.

Now, in the configuration shown in FIG. 1, an A/D converter or the like may be used instead of the DSP 1. In this case, the digital video data conforming to the predetermined data interface standard, and the transfer clock are inputted to the display driver portion 2. The feature according to an embodiment of the present invention is the configuration in which the display driver portion 2 generates and outputs a signal used to drive the display panel 3 by utilizing the digital video data and the transfer clock inputted thereto. Therefore, the structure and function of the circuit portion for outputting the digital video data and the transfer clock to the display driver portion 2 should not be especially limited.

The display driver portion 2 is a portion for display-driving the display panel 3. For this reason, the display driver portion 2 generates data signals for display adapted to a type and a structure of the display panel 3 in a subject stage, and various kinds of timing signals used to control driving timing in the display panel 3 by utilizing the digital video data, and the transfer clock TCLK (and the horizontal and vertical synchronous signals HSYNC and VSYNC) inputted thereto, and outputs the data signals and various timing signals thus generated to the display panel 3.

Note that, in this case, the data signals for display outputted from the display driver portion 2 are signals which are generated in the form of analog voltage values corresponding to the three primary colors of R, G and B. In addition, for example, at least a horizontal clock HCK as a timing clock corresponding to timing for the horizontal scanning (data line driving), and a vertical clock VCK as a timing clock corresponding to timing for vertical scanning (gate line driving) are outputted as the various kinds of timing signals which are outputted together with the data signals for display.

In addition, the display driver 2, for example, is actually structured in the form of one integrated circuit (IC). However, the display driver 2 may be structured in the form of a set of the various kinds of necessary components or parts.

The display panel 3 includes predetermined kinds of display devices. The display panel 3 performs an operation for display by utilizing the data signals for display and the various kinds of timing signals which are inputted thereto from the display driver 2 in the manner as described above. As a result, an image based on the video signals processed in the DSP 1 is displayed on a display screen of the display panel 3.

Here, the basic structure of the display panel 3 of this embodiment has the form in which the pixels are disposed in so-called matrix along the horizontal and vertical directions. Under this condition, a system that the pixels for one horizontal line are not simultaneously driven every one horizontal scanning time period, but the pixel-driving is successively performed for one pixel by one pixel along the horizontal direction is adopted as a system for driving the pixels in the horizontal direction. Note that, in this case, such a system for successively driving the pixels is referred to as "a dot sequential driving system".

A liquid crystal display of a low-temperature polysilicon type or the like, an organic electro luminescence (EL) display and the like can be given as the display devices each adopting the dot sequential driving system in the present circumstances. In the invention of this application, a display panel is not especially limited to the display panel 3 as long as it adopts the dot sequential driving system. However, in this case, the liquid crystal display is adopted as the display panel 3.

Figure 2:
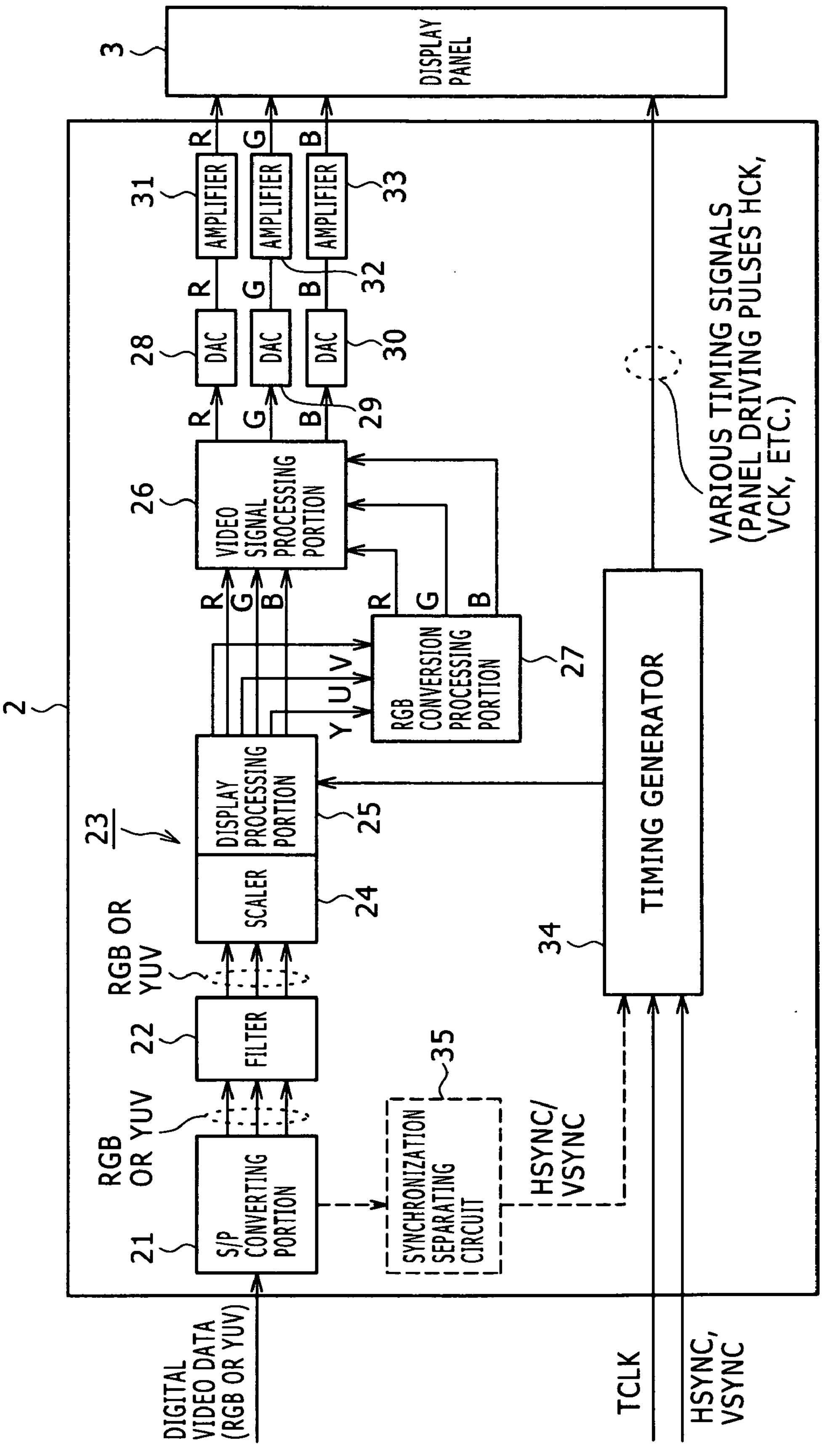
FIG. 2 is a block diagram showing an example of an internal configuration of a display driver portion according to the embodiment of the present invention.

FIG. 2 shows an example of an internal configuration of the display driver 2.

As has been described with reference to FIG. 1, the DSP 1 outputs the digital video data, and the transfer clock TCLK synchronized with the digital video data to the display driver portion 2. In addition, the DSP 1 outputs the horizontal and vertical synchronous signals HSYNC and VSYNC as the signals which are independent of the digital video data, or in the form of being superimposed on the digital video data from the DSP 1 to the display driver 2.

Firstly, it has been formerly described that the digital video data which is inputted to the display driver 2 includes the signal components of the three primary colors of R, G and B, or the signal components of Y, U and V. In this case, this form is such that the data of those signal components is disposed serially in accordance with a predetermined rule. Then, the display driver portion 2 firstly converts the digital video data inputted thereto into data signals having a parallel form in a serial (S)/parallel (P) converting portion 21. In other words, the S/P converting portion 21 separates the digital video data inputted thereto in serial form into the data signals corresponding to the three primary colors of R, G and B, respectively, or data signals corresponding to the color difference signal components of Y (luminance signal), U and V, respectively, and outputs the resulting data signals in a parallel manner.

The data signals having the parallel form outputted from the S/P converting portion 21 are inputted to a filter 22. For example, in order to prevent a return noise (distortion) prevented from occurring in the phase of number-of-pixels converting processing executed in a subsequent stage, the filter 22 removes a predetermined band component from the data signals inputted thereto, and outputs the resulting signals to a scaling processing portion 23.

The scaling processing portion 23 in this case includes a scaler 24 and a delay processing portion 25.

The scaler 24 converts the number of horizontal pixels of the data signals inputted thereto. The data signals inputted to the scaling processing portion 23 (the scaler 24) in parallel manner are based on the digital video data which conforms to the data interface standard and which is outputted from the DSP 1. Therefore, the number of horizontal pixels for those data signals also corresponds to the digital video data conforming to the above-mentioned data interface standard. On the other hand, the display panel 3, for example, has a predetermined number of horizontal pixels which is determined in accordance with its specification and structure. Thus, in general, the number of horizontal pixels concerned is different from that for the digital video data conforming to the data interface standard. In this embodiment as well, the number of horizontal pixels differs between them.

Thus, when the number of horizontal pixels in the stage adopting the form of the video signals inputted to the display driving system via the data interface or the like is different from that of the display device driven by the display driving system, it is necessary to cause the number of horizontal pixels for the video signals to agree with that of the display device. Signal processing therefor is called conversion of the number of pixels, scaling or the like. The scaler 24 executes signal processing for converting the number of horizontal pixels for the data signals inputted thereto into the number of horizontal pixels of the display panel 3. Note that, the method or system which has been known from the past and to which the technique for interpolation processing such as linear interpolation or cubic interpolation is applied may be adopted for such processing for converting the number of pixels itself.

The delay processing portion 25 subjects the data signals obtained after the conversion of the number of pixels in the scaler 24 to delay processing for delaying output timing for the data signals by a predetermined time on data (pixel data) corresponding to one pixel unit.

For example, in the past, when the display device adopting the dot sequential driving system is driven based on the data signals, normally, for example, a time period necessary to drive one pixel is equalized in one horizontal scanning time period. That is to say, the simplest way of thinking is such that a time period which is obtained by equally dividing a length of the time period as one horizontal scanning time period by the number of horizontal pixels (that is, the number of horizontal pixels of the display device) is allocated to a driving time period for one pixel.

However, in this embodiment, the driving time period for each pixel which is controlled in accordance with the horizontal clocks HCK (HCK1 and HCK2) is not uniform, and thus is suitably changed in the manner as will be described later. Then, with regard to the output timing as well for the pixel data constituting the data signals, the pixel data should not be transferred at the output timing for each given time period, but should be transferred at suitable timing, corresponding to the above-mentioned variable driving time period, as the driving timing for such pixels. The delay processing portion 25 is provided for the purpose of delaying the data signals in accordance with the control made by a timing generator 34 which will be described later so as to obtain the transfer timing for such pixel data.

Note that, giving a description as supplement, in comparison with this embodiment, the scaling processing: portion 23 in the past adopts a configuration of omitting the delay processing portion 25 and including only the scaler 24.

The data signals which are outputted from the scaling processing portion 23 after completion of the delay processing in the delay processing portion 25, when having the form corresponding to the color components of R, G and B, are inputted to a video signal processing portion 26 as they are. In addition, for example, when having the form corresponding to the luminance signal and the color difference signal components of Y, U and V, the data signals are temporarily inputted to an RGB conversion processing portion 27. After the data signals are converted in form into the data signals including the color signal components of R, G and B, the resulting data signals are inputted to the video signal processing portion 26. Here, the technique which has been well known until now may be adopted for the conversion processing executed in the RGB conversion processing portion 27.

The video signal processing portion 26 mainly executes signal processing for display image quality adjustment or the like when the data signals inputted thereto including the color signal components of R, G and B are outputted and displayed in the form of an image on the display panel 3. For example, the video signal processing portion 26 executes brightness adjustment, contrast correction, gamma correction and the like.

The data signals of R, G and B which are subjected to the signal processing in the video signal processing portion 26 are then inputted to a digital-to-analog converter (DAC) 28, a DAC 29, and a DAC 30, and are converted into analog voltage values, respectively. Moreover, the resulting analog voltage values are amplified by amplifiers 31, 32 and 33, respectively, and are then inputted to the display panel 3.

In addition, the horizontal and vertical synchronous signals HSYNC and VSYNC, for the digital video data, which are inputted from the DSP 1 to the display driver portion 2, when having the form of being separated from the digital video data, are directly inputted from the DSP 1 side to the timing generator 34 in the display driver portion 2. On the other hand, when having the form of being superimposed on the digital video data, the data signals obtained after the conversion into the serial form in the S/P converting portion 21 are inputted to a synchronization separating circuit 35. After the synchronization separating circuit 35 separates and extracts the horizontal and vertical synchronous signals HSYNC and VSYNC from the data signals, the resulting signals are inputted to the timing generator 34.

In addition, the transfer clock TCLK which is inputted from the DSP 1 to the display driver portion 2 is inputted together with the digital video data, and the horizontal and vertical synchronous signals HSYNC and VSYNC to the timing generator 34.

The timing generator 34 generates the various kinds of timing signals necessary to drive the pixels in the display panel 3 by utilizing the transfer clock TCLK, and the horizontal and vertical synchronous signals HSYNC and VSYNC which are inputted thereto in the manner as described above, and outputs the various kinds of timing signals thus generated to the display panel 3. In this embodiment, this timing signal includes a horizontal clock HCK and a vertical clock VCK. As also has been described above, the horizontal clock HCK is used as the timing clock for the horizontal scanning (data line driving) in the display panel 3. Also, the vertical clock VCK is used as the timing clock for the vertical scanning (gate line driving) in the display panel 3.

A timing chart of FIGS. 3A to 3G shows an example of an operation corresponding to the horizontal pixel driving as an operation in the display driver portion 2 having the configuration described with reference to FIG. 2.

Figure 3:
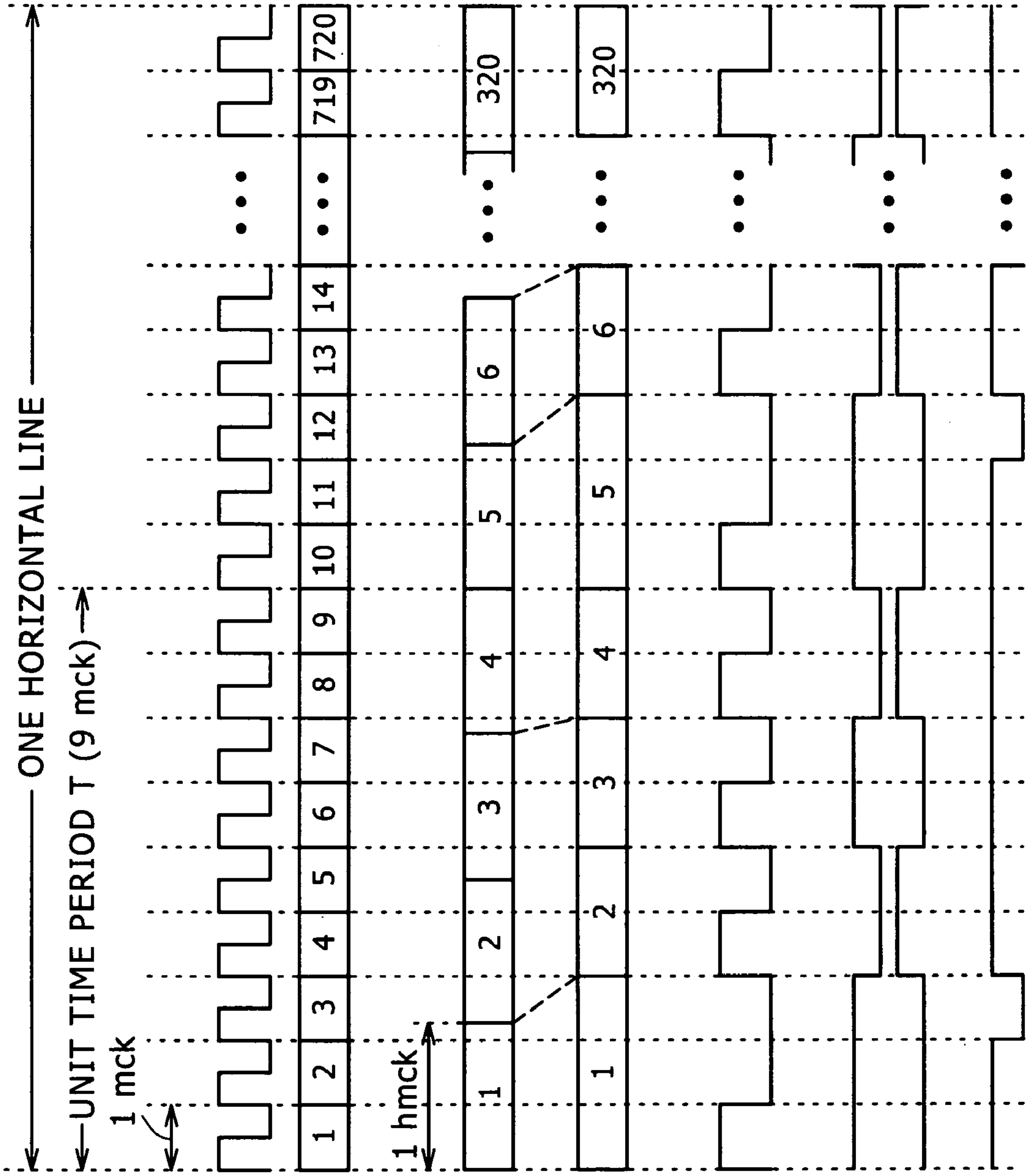
FIGS. 3A to 3G are a timing chart showing a timing relationship between processing for converting the number of horizontal pixels in the display driver portion and horizontal clocks generated by the display driver portion.

Firstly, FIGS. 3A and 3B show the transfer clock TCLK which is inputted from the DSP 1 side to the display driver portion 2, and the digital video data (referred to as "the input video data" as well in this case) which is synchronized with the transfer clock TCLK, respectively. In this case, there is shown the input video data having the form in which one horizontal line has 720 pixels (dots). That is to say, the form having the number of horizontal pixels of 720 is regulated as the video data form conforming to the data interface standard. FIG. 3B shows the digital video data so as to give numbers of 1 to 720 to the pixel data in arrangement order in correspondence to the transfer clock TCLK of FIG. 3A. In this case, the entire pixel data is indicated as the pixel data 1 to 720. This is also applied to data signals after simple scaling shown in FIG. 3C, and data signals after being synchronized with the horizontal clock HCK as shown in FIG. 3D.

The transfer clock TCLK of FIG. 3B is a general clock having an equal one period (1 mck). In this case, the transfer clock TCLK of FIG. 3B, for example, has a frequency of 13.5 MHz. Also, in this case, the input video data shown in FIG. 3A is synchronized with the transfer clock TCLK such that the image data is switched over to another one at the timing for each rise of the transfer clock TCLK.

In this case, the number of horizontal pixels of the display panel 3 is 320. Therefore, the scaler 24 shown in FIG. 2 is structured so that the number of horizontal pixels for the data signals inputted thereto is converted from 720 to 320. That is to say, the scaler 24 performs the conversion of the number of pixels by executing the interpolation processing or the like corresponding to 720:320=9:4 as the number-of-pixels ratio. The timing for the pixel data 1 to 320 in the data signals obtained in the stage of converting the number of pixels by the scaler 24 is as shown in FIG. 3C.

As also has been described above, the scaler 24 in the scaling processing portion 23 simply executes only the processing for converting the number of horizontal pixels through the interpolation processing or the like. Therefore, when the data signals in the stage of being subjected to the processing for converting the number of pixels by the scaler 24 is viewed as a sequence of the pixel data, as shown in FIG. 3C, this sequence can be viewed as having the form in which the pixel data 1 to 320 is arranged in the 320 equal time periods (1 h mck) into which the time period (one horizontal scanning time period) corresponding to one horizontal line is divided, respectively.

For example, in the related art, the horizontal clock HCK to be supplied to the display panel 3 has been generated in correspondence to the timing for the pixel data shown in FIG. 3C. That is to say, the horizontal clock HCK is generated so as to have a given period with a predetermined frequency which is determined based on a time length of one horizontal scanning time period, and the number of horizontal pixels after completion of the conversion processing.

On the other hand, in this embodiment, for example, as shown in FIG. 3E or FIG. 3F, the horizontal clock HCK having no constant period is generated in the manner as will be described below.

Here, FIG. 3E shows the horizontal clock HCK when one-phase clock is set, and FIG. 3F shows the horizontal clock HCK when two-phase clock is set. Firstly, the concept of the pixel driving timing in the horizontal direction, and the horizontal clock HCK corresponding thereto in this embodiment will be described below by giving the one-phase clock shown in FIG. 3E as an example with reference to FIG. 3D as well.

In this case, the ratio of the number of horizontal pixels before execution of the processing for converting the number of pixels by the scaler 24 to the number of horizontal pixels after execution thereof, as described above, is 720:320=9:4.

This means that the four continuous pixel data of the data signals after execution of the processing for converting the number of pixels should be allocated to each unit time period T for which the nine pixel data of the data signals before execution of the processing for converting the number of pixels is continuous. As for this allocation method, when the time period for each four pixel data in the unit time period T is equalized, the form shown in FIG. 3C is obtained.

On the other hand, the above-mentioned unit time period T is regarded as the time period for which one period (mck) of the transfer clock TCLK is set as a minimum basic circuit, and the minimum basic units continue by nine times. Under this condition, when the unit time period T is divided into four parts by the time period formed based on a value which is an integral multiple of mck, the following expression is obtained:

$$9=3+2+2+2$$

Thus, it is derived based on that expression that the time periods having a combination of 3 mck, 2 mck, 2 mck and 2 mck (9 mck in total) can be allocated as the time periods, for the four pixel data after execution of the processing for converting the number of pixels, which are allocated to the unit time period T (9 mck).

FIG. 3D shows an example of the data signals after execution of the processing for converting the number of horizontal pixels based on the above-mentioned allocation method.

That is to say, the four pixel data, i.e., the pixel data 1 to 4 in the signal data shown in FIG. 3D is allocated in correspondence to the first unit time period T shown in FIG. 3B. Then, firstly, the time period of 3 mck is set for the pixel data 1, and the time period of 2 mck is allocated to each of the remaining pixel data 2, 3 and 4. From now on, similarly, the time periods of 3 mck, 2 mck, 2 mck and 2 mck are allocated to the continuous four pixel data after execution of the processing for converting the number of pixels every unit time period T of the remaining 79 unit time periods T.

Then, the horizontal clock HCK of this embodiment should have such a waveform pattern as to obtain the data writing timing for the pixels and so as to agree with the time periods of the pixel data shown in FIG. 3D.

Then, in the case of the one-phase horizontal clock HCK, when the timing of the leading edge of the one-phase horizontal clock HCK is set as the data writing start timing, as shown in the first unit time period T in FIG. 3E, an H level is set in the first time period of 1 mck corresponding to the pixel data 1 (FIG. 3B) before the conversion of the number of pixels, the time period of 1 mck corresponding to the pixel data 4 before the conversion of the number of pixels, the time period of 1 mck corresponding to the pixel data 6 before execution of conversion of the number of pixels, and the time period of 1 mck corresponding to the pixel data 8 before execution of conversion of the number of pixels. In addition, an L level is set in the time periods of 1 mck corresponding to the remaining pixel data 2, 3, 5 and 7 before execution of conversion of the number of pixels, respectively. Also, for example, the H level time periods and the L level time periods are set based on the same pattern as that of the above case every unit time period T of the remaining 79 unit time periods.

That is to say, with respect to the one-phase horizontal clock HCK, when the time period of 1 mck having the H level set therein, and the L level time period next thereto are regarded as one period, it is said that the time of one period is changed in correspondence to the time period which is an integral multiple of mck to be allocated. Under this condition, when the time of one period is changed, the head inversion interval having the H level set therein is fixed to 1 mck, and the next inversion interval having the L level set therein is variably set between 1 mck and 2 mck.

The setting of the horizontal clock HCK having such a pattern results in that one unit time period T is divided by the sequence of 3 mck, 2 mck, 2 mck and 2 mck based on the leading edge of the horizontal clock HCK.

The case where the horizontal clock HCK shown in FIG. 3D is set as having the two-phase pattern has the form as shown in FIG. 3F. That is to say, a combination of 3 mck, 2 mck, 2 mck and 2 mck is set for the inversion interval of the clock within one unit time period, and two horizontal clocks HCK1 and HCK2 having respective waveforms which are mutually inverted are generated and outputted. In the two-phase horizontal clocks HCK1 and HCK2 thus generated, the inversion timing from the H level to the L level, and the L level to the H level becomes the timing at which the data is started to be written to the corresponding pixels. In this case, it is possible to obtain the same driving timing as that of the one-phase horizontal clock HCK. Note that, which of one phase or two phases are actually adopted for the horizontal clock HCK in the display driving system of this embodiment should be determined in accordance with the condition, specification and the like in design in the actual case.

Now, as described above, the horizontal clocks HCK (HCK1 and HCK2) of this embodiment are not uniform in its period and inversion interval. The delay processing portion 25 in the scaling processing portion 23 of FIG. 2 is provided so that the data signals can be properly synchronized with the horizontal clocks HCK (HCK1 and HCK2), in pixel data, which are not uniform in their periods in the manner as described above.

For example, the output timing of the pixel data in the stage in which the scaler 24 simply performs the conversion of the number of pixels, as shown in FIG. 3C, corresponds to the equal time period of 1 h mck which is obtained by dividing one unit time period into four equal parts. As can be seen from the comparison of the timing of the horizontal clocks HCK (HCK1 and HCK2) of this embodiment shown in FIGS. 3E and 3F with the output timing of the pixel data of FIG. 3C, for example, the start timing of the pixel data in and after the second one in the unit time period T precedes the horizontal clocks HCK (HCK1 and HCK2). That is to say, when the output timing of the pixel data is held as it is as shown in FIG. 3C, it may be impossible to obtain the synchronization with the horizontal clocks HCK (HCK1 and HCK2).

Then, as shown in the first unit time period T in FIG. 3D, for example, the pixel data 2 is delayed to a time point at which 3 mck elapses from the output time point of the pixel data 1. Moreover, the pixel data 3 is delayed to a time point at which 2 mck elapses from the output time point of the pixel data 2, the pixel data 4 is delayed to a time point at which 2 mck elapses from the output time point of the period data 3, and so forth on. Thus, the output timing for the pixel data is controlled so as to give a delay time which is an integral multiple of the necessary mck. As a result, there are obtained the output time periods for the individual pixel data synchronized with the horizontal clocks HCK (HCK1 and HCK2) of this embodiment.

Note that, the timing generator 34 controls the output timing for the pixel data in the delay processing portion 25. The timing generator 34, for example, outputs a switching timing signal for the pixel data corresponding to the horizontal clocks HCK (HCK1 and HCK2) generated by itself to the delay processing portion 25. The delay processing portion 25 starts to output the pixel data in response to reception of the timing signal as its input, and continues to output the pixel data until a next timing signal is obtained. When the timing signal is newly obtained, the delay processing portion 25 switches the output of the current pixel data over to the output of the next one.

In this embodiment, in the manner as described above, the display driver portion 2 converts the number of horizontal pixels about the video data inputted thereto, and generates the horizontal clocks HCK (HCK1 and HCK2) to be synchronized with the video data (data signals) after the conversion.

Here, the one-phase horizontal clock HCK has the waveform in which the inversion interval having the L level set therein is changed with an integral multiple of mck after the inversion interval having the H level set therein in one period is fixed to 1 mck (the time of one period of the transfer clock TCLK). In addition, the two-phase horizontal clocks HCK1 and HCK2 have the respective waveforms in each of which the inversion interval having the H/L level set therein is changed with an integral multiple of mck. Therefore, the horizontal clock of this embodiment, with respect to any of the one-phase one or the two-phase ones as well, can be generated by changing the output at the H/L level in accordance with the necessary pattern based on the transfer clock TCLK having 1 mck as one period. As a result, a structure for generation of the horizontal clock which should be actually provided in the timing generator 34, for example, can be realized by a combination of simple logical circuits or the like which operate in accordance with the transfer clock TCLK as a clock (CL) inputted thereto.

In the past, the driving time per horizontal pixel driving and per one pixel, for example, has been given the equal time periods which are obtained by equally dividing one horizontal scanning time period by the number of horizontal pixels. In this case, the PLL circuit has been specially provided and has generated the horizontal clock having the period corresponding to the number of horizontal pixels before the conversion processing unless the relationship between the number of horizontal pixels before the conversion and the number of horizontal pixels after the conversion, for example, has been expressed by 2 to the n-th power or the like.

On the other hand, according to this embodiment, as has been described above, the simple logical circuit and the like can generate the horizontal clock for the pixel driving irrespective of the ratio of the number of pixels before the conversion processing to the number of pixels after the conversion processing. As a result, the PLL circuit becomes unnecessary. Comparing the structure for generation of the horizontal clock which should be provided in this embodiment with the PLL circuit, it is obvious that the cost down and the reduction in circuit substrate size are realized all the more because the circuit scale may be smaller in this embodiment than in the related art.

In addition, when the PLL circuit generates the horizontal clock, the synchronization with the transfer clock before execution of the processing for converting the number of pixels is lost. In order to solve this problem, for example, in general, a memory to/from which the data signals are inputted/outputted by utilizing first in first out (FIFO) should be provided. However, in this embodiment, the horizontal clock is generated by utilizing the transfer clock TCLK before execution of the processing for converting the number of pixels, and thus the synchronization is maintained before and after the conversion processing. Hence, the memory as described above is also unnecessary. In this respect as well, the above-mentioned advantage is further promoted.

Note that, the structure of the delay processing portion 25 for delaying the data signals in pixel data is necessary in correspondence to the situation in which the time of one period or the inversion time period of the horizontal clock is changed in this embodiment. However, for example, the circuit scale may be much smaller in this embodiment than in the case where the PLL circuit and the memory of the FIFO type are mounted.

In addition, according to this embodiment, even if how the ratio of the number of pixels before the conversion processing to the number of pixels after the conversion processing changes, the horizontal clock for the pixel driving can be generated in accordance with the transfer clock TCLK based on the way of thinking described with reference to FIGS. 3A to 3G without, for example, requiring the PLL circuit or the like. Therefore, seeing this situation from a different angle, according to this embodiment, in spite of the configuration including no PLL circuit for the purpose of generating the horizontal clock, there is especially no limit to the number of pixels after the conversion processing. As a result, there is also obtained an advantage that no degree of freedom for selection of the number of pixels of the display panel 3 is impeded.

Subsequently, a description will be given with respect to an example of the operation for driving the pixels in the horizontal direction which is performed inside the display panel 3 based on the data signals and the horizontal clocks HCK (HCK1 and HCK2) generated in the display driver portion 2 in the manner as has been formerly described with reference to FIGS. 4 and 5.

Figure 4:
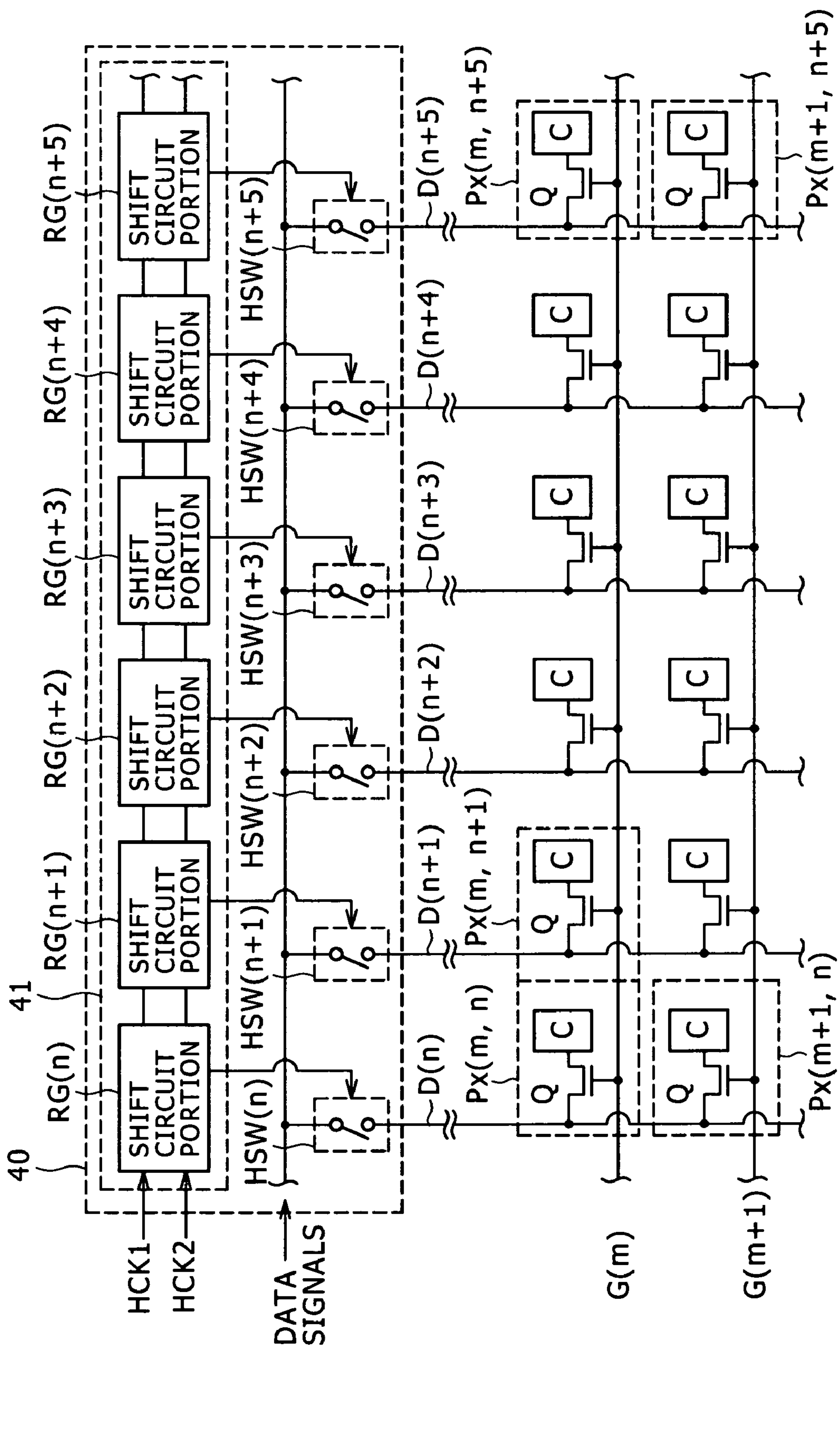
FIG. 4 is a diagram showing a structural example of a display panel.

Firstly, FIG. 4 shows an example of a circuit structure of an inside of the display panel 3 of this embodiment. In this case, the display panel 3 is basically a liquid crystal display device adopting the dot sequential driving system. In addition, a structure corresponding to the data signal of one color of R, G and B is extracted and shown in the figure for the sake of convenience of a description. Actually, the structure shown in the figure is provided in correspondence to the color signal for each of R, G and B.

As shown in the figure, a necessary number of pixel cell driving circuits Px each corresponding to one display pixel are prepared in the display panel 3 and are arranged in matrix. One pixel cell driving circuit Px includes a pixel switch Q and a pixel capacitor C. The pixel switch Q, for example, has a structure as a field effect transistor (FET). For example, a gate of the pixel switch Q is connected to predetermined one gate line G and a drain thereof is connected to predetermined one data line D. A source of the pixel switch Q is connected to the pixel capacitor C.

Under this condition, while not illustrated in the figure, for example, a substrate in which a common electrode to which a predetermined common potential is applied is formed is disposed so as to face a plane portion on which the pixel cell driving circuits Px are arranged in matrix through a liquid crystal layer.

Gate lines G(m), G(m+1), . . . are provided so as to correspond to horizontal lines, respectively. The gates of the pixel switches Q of the pixel cell driving circuits Px for one horizontal line are connected to the corresponding one of the gate lines G(m), G(m+1), . . . . A vertical scanning circuit (not shown) scans these gate lines G. The vertical scanning circuit includes a shift register and the like in the manner as well known, and applies successively a gate voltage to the gate lines in the manner as will be described later.

In addition, the horizontal scanning circuit 40 adopts the following structure in correspondence to the dot sequential driving system.

The horizontal scanning circuit 40, firstly, is provided with a shift register 41 including shift circuit portions RG(n), RG(n+1), . . . , RG(n+5), . . . which are connected in serial so as to correspond to data lines D(n), D(n+1), . . . , D(n+5), . . . , respectively. In addition, similarly, the horizontal scanning circuit 40 is provided with data line switches HSW(n), HSW(n+1), . . . , HSW(n+5), . . . which are provided so as to correspond to the shift circuit portions RG(n), RG(n+1), . . . , RG(n+5), . . . , respectively.

The two-phase horizontal clocks HCK1 and HCK2 are inputted to the shift register 41 in this case in the manner as shown in the figure. Outputs from the shift circuit portions RG(n), RG(n+1), . . . , RG(n+5), . . . are inputted as ON/OFF control signals to the corresponding data line switches HSW(n), HSW(n+1), . . . , HSW(n+5), . . . , respectively.

In addition, one ends of the data line switches HSW(n), HSW(n+1), . . . , HSW(n+5), . . . are commonly connected to a line for. the data signals outputted from the display driver portion 2. The data signals supplied to this line are ones described with reference to FIG. 3D and are synchronized with the horizontal clocks HCK1 and HCK2. The other ends of the data line switches HSW(n), HSW(n+1), . . . , HSW(n+5), . . . are connected to the corresponding data lines D(n), D(n+1), . . . , D(n+5), . . . , respectively.

An operation of the display panel 3 thus structured in the phase of the image display is as follows.

Firstly, the vertical scanning circuit (which is not shown in FIG. 4) scans the gate lines G(m), G(m+1), . . . .

That is to say, the vertical scanning circuit scans the gate lines G(m), G(m+1), . . . in a line sequential manner in the order of G(m)→G(m+1)→ . . . along the vertical direction at timing for each one horizontal scanning time period. While the gate line is scanned, a gate voltage used to turn ON the corresponding pixel switches Q is applied to the gate line concerned. Thus, all the pixel switches Q having the respective gates connected to the gate line concerned become an ON state. On the other hand, while no gate line is scanned, all the pixel switches Q connected to the gate line concerned are in an OFF state since a potential used to turn OFF the corresponding pixel switches Q is developed on the gate line concerned.

Then, within a time period for which one gate line is scanned (one horizontal scanning time period), the horizontal scanning circuit 40 operates to perform ON/OFF control for the data line switches HSW(n), HSW(n+1), . . . , HSW(n+5), . . . in the manner as shown in FIGS. 5A to 5G.

Figures 5A, 5B, 5C, 5D, 5E, 5F, 5G:
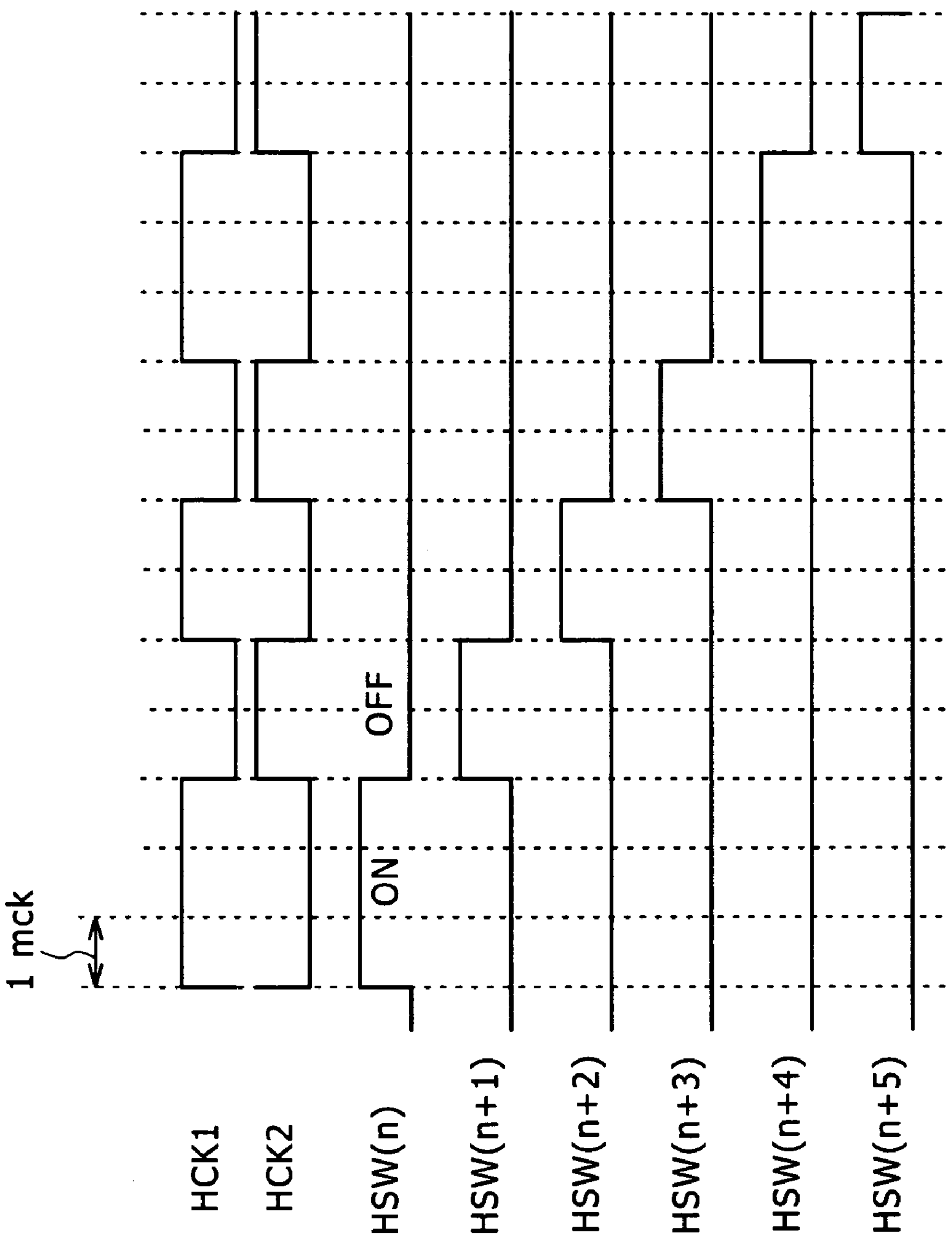
FIG. 5 is a timing chart showing an example of timing at which pixel data is written as timing of ON/OFF control for a data line switch in the display panel.

That is to say, for example, the horizontal clocks HCK1 and HCK2 shown in FIG. 5A are inputted to the shift register 41 in the horizontal scanning circuit 40. Those horizontal clocks HCK1 and HCK2 have the same waveform patterns as those described with reference to FIG. 3F. The shift register 41 operates in accordance with the horizontal clocks HCK1 and HCK2 received as its inputs, which results in that the ON/OFF timing for the data line switches HSW(n), HSW(n+1), . . . , HSW(n+5), . . . is controlled in the manner as shown in FIGS. 5B to 5G. Note that, the ON/OFF patterns shown in FIGS. 5B to 5G, respectively, can also be regarded as the patterns of the H/L levels of the outputs of the shift circuit portions RG(n), RG(n+1), . . . , RG(n+5), . . . .

As can be understood from the structure of FIG. 4, while the data line switch HSW is in an OFF state, the corresponding data line and the line for the data signals are disconnected from each other. Hence, no voltage values as the data signals are applied to the data line concerned. On the other hand, when the data line switch HSW becomes an ON state and thus the corresponding data line and the line for the data signals are connected to each other, the voltage values as the data signals are applied to the data line concerned.

Specifically, in FIGS. 5A to 5G, firstly, the data line switch HSW(n) becomes the ON state for the time period of 3 mck in accordance with the horizontal clocks HCK1 and HCK2 in the inversion time period of 3 mck. At this time, a voltage value corresponding to one pixel data is outputted as the data signal synchronized with the horizontal clocks HCK1 and HCK2 to the line for the data signals for a time period of 3 mck. This voltage value is applied to the data line D(n) through the data line switch HSW(n). As a result, the electric charges are accumulated in the pixel capacitor C through the pixel switch Q in one pixel cell driving circuit Px located at an intersection between the gate line being scanned and the data line D(n). That is to say, the data is written to one pixel. Then, a liquid crystal of the liquid crystal layer corresponding to that intersection is excited in correspondence to the data thus written thereto. In other words, the pixel cell is driven.

In addition, after completion of the ON time period of the data line switch HSW(n) for the time period of 3 mck, subsequently, the ON state is switched in the order of the data line switches HSW(n+1), HSW(n+2) and HSW(n+3) every lapse of the time period of 2 mck. In response to this switching, the voltage value for the pixel data outputted every lapse of the time period of 2 mck is successively written to the pixel cell driving circuits Px located at the intersections between the data lines D(n+1), D(n+2) and D(n+3) and the gate line being scanned. After this, the ON states of the data line switches HSW are successively switched from the data line switch HSW(n+4) in accordance with the time period pattern of 3 mck→2 mck→2 mck→2 mck similarly to the above case. In response thereto, the data is successively written to the pixel cell driving circuit Px located at the intersection between the gate line being scanned and the data line D to which the voltage value of the pixel data is applied. Thus, the liquid crystals corresponding to the intersections, respectively, are successively excited.

As described above, the display panel 3 of this embodiment does not drive simultaneously a group of horizontal pixels constituting one horizontal line (gate line) by utilizing an active matrix system, but drives the pixels in order on one pixel by one pixel basis. That is to say, the display panel 3 of this embodiment drives the pixels by utilizing the dot sequential driving system. Under this condition, according to this embodiment, the pixels in the horizontal line in the display panel 3 are successively driven at the timing of the horizontal clocks HCK1 and HCK2 generated as described in FIG. 4 in the manner as described with reference to FIGS. 5A to 5G. Here, the shift register 41 operates to perform the shift at the timing of the leading edge of the one-phase horizontal clock HCK shown in FIG. 3E, and such an operation is performed every all the horizontal lines, thereby completing the operation for writing the data for one picture. Then, the operation for writing the data for one picture, for example, is repeatedly performed with a field period (the vertical clock VCK is used to control the timing for each field period), thereby performing the image display. As described above, according to this embodiment, the horizontal pixels are properly driven in accordance with the horizontal clocks HCK (HCK1 and HCK2) (refer to FIGS. 3E and 3F), of this embodiment, generated in the manner as described in FIGS. 3A to 3G, and based on the data signals (refer to FIG. 3D) the output timing of which is adjusted in pixel data by the delay processing portion 25. As a result, the image is also properly displayed.

Now, with the configuration for the display driving of this embodiment which has been described until now, for example, the pixel driving time period is formed by dividing a unit time period of 9 mck into the four parts of 3 mck, 2 mck, 2 mck and 2 mck, and the pixels are successively driven with these pixel driving time periods. Then, the pixels are continuously and repeatedly driven every lapse of the unit time period in accordance with this driving pattern.

However, such a pixel driving system causes a time difference to occur between 3 mck and 2 mck in the pixel driving time period. That is to say, in driving the pixels of one horizontal line, the different writing time periods for the pixel data mixedly exist. Such a difference in writing time period for the pixel data, for example, appears in the form of a luminance difference in pixels in terms of the display results.

In particular, the sequence having the order of 3 mck→2 mck→2 mck→2 mck is repeated at the timing for the horizontal clocks HCK (HCK1 and HCK2) shown in FIGS. 3A to 3G, and FIG. 4. Therefore, the data line driven for the pixel driving time period of 3 mck, and the data line driven for the pixel driving time period of 2 mck are fixed. As a result, the luminance difference occurs between the pixel column for the driving time period of 3 mck and the pixel column for the driving time period of 2 mck due to the above-mentioned time difference in pixel driving time period. Thus, the image quality degradation that a streak appears in the vertical direction may be caused in terms of the display image.

Thus, the following two examples will now be given as the constitution of this embodiment for unifying the luminance difference between the pixel columns.

Firstly, a first example will now be described with reference to FIGS. 3A to 3G again.

FIGS. 3A to 3G, FIG. 3G shows a data enable signal DE. The data enable signal DE in this case is a signal which is used to set validity/invalidity of the output with respect to the data signals (based on the same timing as that shown in FIG. 3D) after being delayed by the delay processing portion 25. In this case, the data enable signal DE is set such that the data output is valid when the data enable signal DE is at the H level, and is invalid when the data enable signal DE is at the L level. As can be seen by comparing FIG. 3D and FIG. 3G with each other, the invalid time period of the data output for which the data enable signal DE in this case is at the L level corresponds to the last time period of 1 mck in the time period of 3 mck for which the pixel data is outputted. For example, the data signals (pixel data) which are delayed by the delay processing portion 25 and thus for which the same output timing as that shown in FIG. 3D is generated are controlled so as not to be outputted for the time period for which the data enable signal DE is at the L level.

The output of the data signals is controlled in such a manner, which results in that a stop time period of 1 mck is formed in the time period of 3 mck for writing of the pixel data, and thus a length of the substantially valid time period for writing of the pixel data becomes 2 mck. As a result, the valid time periods for writing of the pixel data become an equal time length of 2 mck for all the pixels.

Here, 1 mck as the above-mentioned stop time period corresponds to a time period which is obtained by subtracting the time period of 2 mck for writing of the pixel data (corresponding to the shortest writing time period) from the time period of 3 mck for writing of the pixel data (corresponding to the longest writing time period).

As described above, in the case of the first example, the substantially valid writing time period in the longer writing time period (corresponding to the longest writing time period) is made equal to the shorter writing time period (corresponding to the shortest writing time period), thereby unifying the data writing time period for each pixel. Thus, the luminance difference between the pixels as has been formerly described is removed, which results in that for example, the image quality degradation that the streak or the like appears in the displayed image is dissolved.

Note that, the data enable signal DE may be generated by the timing generator 34. The inversion timing for the H/L level of the data enable signal DE as well corresponds to the period of one period of mck of the transfer clock TCLK. Hence, a circuit for generating the data enable signal DE, for example, can also be structured in the form of a simple logical circuit which is adapted to receive as its input the transfer clock TCLK and to obtain the output shown in FIG. 3G. For example, passage and interruption of the data signals may be controlled in a necessary portion in a stage in and after the delay processing portion 25 in the display driver portion 2 in accordance with the data enable signal DE. Or, the data enable signal DE is also supplied together with the horizontal clocks HCK (HCK1 and HCK2) and the data signals from the display driver portion 2 to the display panel 3. In this case, for example, the inside of the display panel 3 may be structured so as to be controlled so that the data line switch HSW is turned OFF at the timing at which the data enable signal DE becomes the L level.

Figure 6:
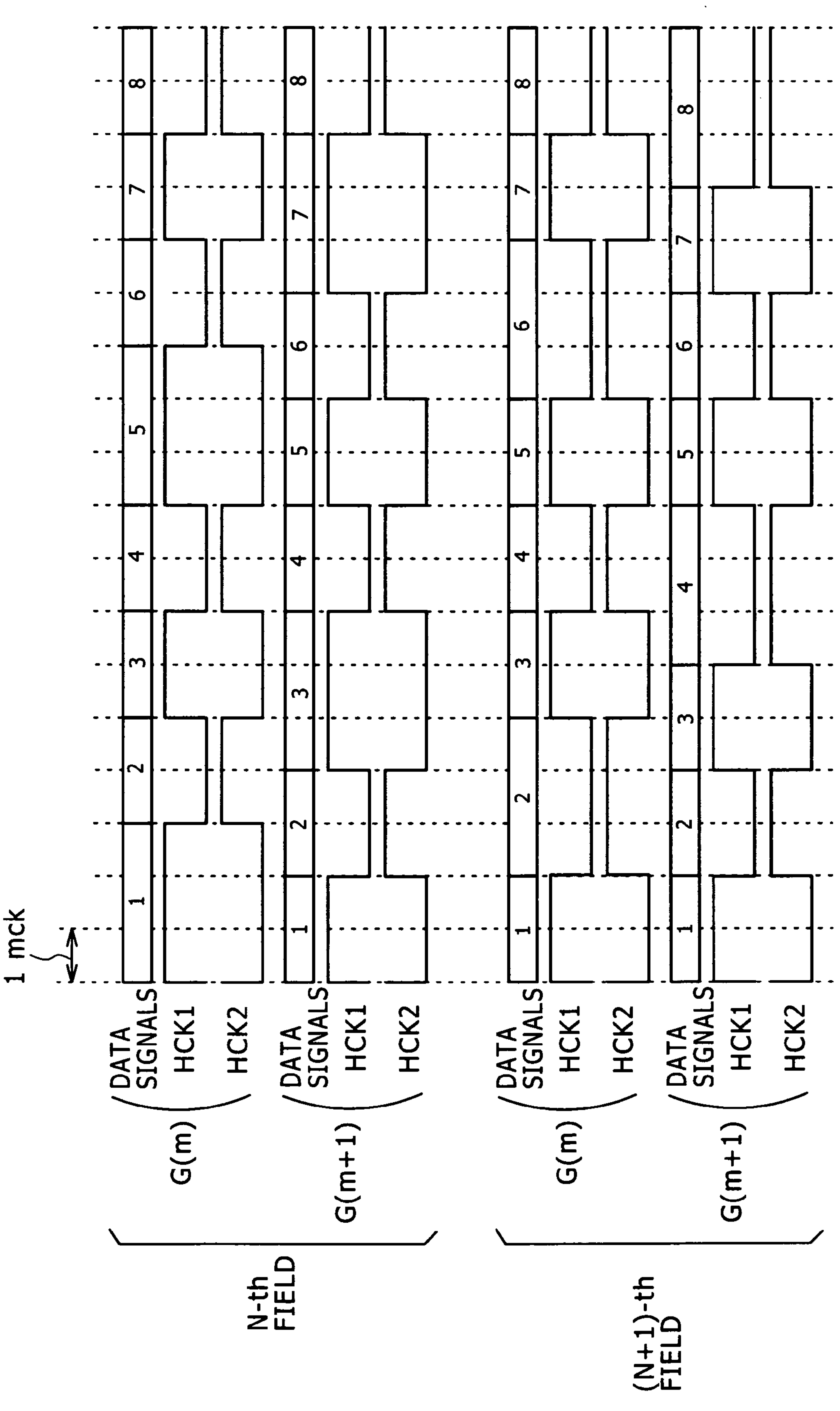
FIG. 6 is a timing chart showing an example of driving timing (an example of generation of horizontal clocks) for dissolving a luminance difference between the pixels.

In addition, a second example for dissolving the luminance difference between the pixel columns will now be described with reference to FIG. 6. FIG. 6 shows timing when the horizontal pixels corresponding to the gate lines G(m) and G(m+1), respectively, are driven in each of an N-th field time period and an (N+1)-th field time period following the N-th field time period.

Firstly, in the figure, with regard to the horizontal pixel driving timing while the gate line G(m) is scanned in the N-th field time period, the pixels are successively driven for the pixel data in and after the pixel data 1 by repeating the inversion interval pattern of [3 mck→2 mck→2 mck→2 mck]. In this case, each of the pixel data 1, 5, 9, . . . , (1+4n (n is an integral number equal to or larger than zero) is written for the time length corresponding to 3 mck.

In addition, in the same N-th field time period, while the gate line G(m+1) is scanned on the heels of the above-mentioned gate line G(m), the pixels are successively driven for the pixel data in and after the pixel data 1 by repeating the changed inversion interval pattern of [2 mck→2 mck→3 mck→2 mck]. In this case, each of the pixel data 3, 7, 11, . . . , (3+4n) is written for the time length corresponding to 3 mck.

Note that, while not illustrated in the figure, for example, while the gate line G(m+2) is scanned, the pixels are successively driven for the pixel data in and after the pixel data 1 in accordance with the inversion interval pattern of [2 mck→3 mck→2 mck→2 mck]. Thus, each of the pixel data 2, 6, 10, . . . , (2+4n) is written for the time length corresponding to 3 mck. Moreover, while the next gate line G(m+3) is scanned, the pixels are successively driven for the pixel data in and after the pixel data 1 in accordance with the inversion interval pattern of [2 mck→2 mck→2 mck→3 mck]. Thus, each of the pixel data 4, 8, 12, . . . , (4+4n) is written for the time length corresponding to 3 mck. After this, the timing pattern for the horizontal pixel driving performed so as to correspond to the gate lines G(m) to G(m+3) is repeated. In addition, the timing generator 34 issues an instruction to the delay processing portion 25 so that the suitable delay timing for the pixel data is obtained in correspondence to a change in pixel data driven for the driving time period of 3 mck in such a manner.

In addition, in the time period for the scanning of the gate line G(m) in the (N+1)-th field time period following the N-th field time period, the pixels are successively driven for the pixel data in and after the pixel data 1 by repeating the sequence of [2 mck→3 mck→2 mck→2 mck]. Thus, each of the pixel data 2, 6, 10, . . . , (2+4n) is written for the time length corresponding to 3 mck. In addition, while the gate line G(m+1) following the gate line G(m) is scanned, the pixels are successively driven for the pixel data in and after the pixel data 1 by repeating the sequence of [2 mck→2 mck→2 mck→3 mck]. Thus, each of the pixel data 4, 8, 12, . . . , (4+4n) is written for the time length corresponding to 3 mck.

Here, comparing the pattern for the horizontal pixel driving in the time period for the scanning of the gate line G(m) in the N-th field with that in the (N+1)-th field, it is understood that the pixel data corresponding to the driving time period of 3 mck is the pixel data 1 in the N-th field and the pixel data 3 in the (N+1)-th field which are different from each other. In addition, similarly, comparing the pattern for the horizontal pixel driving in the time period for the scanning of the gate line G(m+1) in the N-th field with that in the (N+1)-th field, it is understood that the pixel data corresponding to the driving time period of 3 mck is the pixel data 2 in the N-th field and the pixel data 4 in the (N+1)-th field which are different from each other.

Note that, in the time period for the scanning of the gate line G(m+2) following the gate line G(m+1) in the (N+1)-th filed time period, the pixels are successively driven for the pixel data in and after the pixel data 1 by repeating the sequence of [3 mck→2 mck→2 mck→2 mck]. Thus, each of the pixel data 1, 5, 9, . . . , (1+4n) is written for the time length corresponding to 3 mck. Moreover, in the time period for the scanning of the subsequent gate line G(m+3), the pixels are successively driven for the pixel data in and after the pixel data 1 by repeating the sequence of [2 mck 2 mck→3 mck→2 mck]. Thus, each of the pixel data 3, 7, 11, . . . , (3+4n) is written for the time length corresponding to 3 mck. After this, the timing pattern for the horizontal pixel driving performed so as to correspond to the gate lines G(m) to G(m+3) is repeated. In other words, in the field time period as well, the driving time period of 3 mck is prevented from being redundantly set in the pixel data having the same number (horizontal pixel position) between the adjacent gate lines (corresponding to the two sequential horizontal scanning time periods).

In addition, in the time period for the scanning of the gate line G(m) in the (N+2)-th field following the (N+1)-th field, the pixels are successively driven for the pixel data in and after the pixel data 1 by repeating the sequence of [2 mck→2 mck→3 mck→2 mck]. Thus, each of the pixel data 3, 7, 11, . . . , (3+4n) is written for the time length corresponding to 3 mck. As a result, the driving time period of 3 mck is prevented from being set in the same pixel data as that in the (N+1)-th field. Moreover, in the time period for the scanning of the gate line G(m) in the subsequent (N+3)-th field time period, the pixels are successively driven for the pixel data in and after the pixel data 1 by repeating the sequence of [2 mck→2 mck→2 mck→3 mck]. Thus, each of the pixel data 4, 8, 12, . . . , (4+4n) is written for the time length corresponding to 3 mck, thereby shifting the driving time period of 3 mck. After this, with respect to the gate line G(m), the timing pattern for the horizontal pixel driving from the N-th field to the (N+3)-th field is repeated.

As described above, in the case of the second example, firstly, in the one field time period, the appearance pattern of the inversion interval of the horizontal clocks HCK (HCK1 and HCK2) is changed every lapse of the horizontal scanning time period. As a result, the driving time period of 3 mck is prevented from being set in the pixels located in the same horizontal pixel positions between the adjacent gate lines (corresponding to the two sequential horizontal scanning time periods) within one field time period. That is to say, the pixel position corresponding to the driving time period of 3 mck is diffused in correspondence to the progress of the horizontal scanning time period. Thus, the total of the valid driving time periods when each of them is viewed as the pixel column unit within the field time period is unified. As a result, first of all, the luminance difference between the pixel columns is relaxed and dissolved.

In addition, in the second example, the appearance pattern of the inversion interval of the horizontal clocks HCK (HCK1 and HCK2) is changed every lapse of the field time period as well, whereby the driving time period of 3 mck is prevented from being redundantly set in the same pixel in the display panel 3 in the two sequential field time periods. That is to say, when being viewed in terms of the field period, the pixel position corresponding to the driving time period of 3 mck is diffused in a time base direction. Combining this process with a change of the appearance pattern of the inversion interval of the horizontal clocks HCK corresponding to the time base direction with the horizontal scanning time period as a unit, the pixel corresponding to the driving time period of 3 mck is diffused not only in the horizontal direction, but also in the vertical direction. As a result, the total of the valid driving time periods in the unit time periods about the individual pixels constituting the display panel 3 is unified. In addition, this second example is advantageous in that no luminance efficiency is impaired because all the time periods each corresponding to 3 mck become valid as the time periods for writing of the pixel data.

Note that, in the second example, the appearance pattern of the inversion interval of the horizontal clocks HCK (HCK1 and HCK2) is changed with the two time base directions, i.e., with the time base direction corresponding to the period of the horizontal scanning time period, and the time base direction corresponding to the field period. However, even when the appearance pattern of the inversion interval of the horizontal clock HCK (HCK1 or HCK2) corresponding to one of the two time base directions is fixed, and only the appearance pattern of the inversion interval of the horizontal clock HCK (HCK1 or HCK2) corresponding to the other time base direction is changed, the luminance difference between the pixel columns in the unit time can be reduced within a given range. Therefore, for example, the constitution may also be adopted in which the pixels are successively driven by utilizing only one of these techniques depending on the actually necessary image quality. With such a constitution, for example, a circuit for generating the horizontal clocks HCK (HCK1 and HCK2) in the timing generator 34 can be formed with a simpler structure.

In addition, in the example shown in FIG. 6, the appearance pattern of the inversion interval of the horizontal clocks HCK (HCK1 and HCK2) is changed every lapse of one horizontal scanning timing period in correspondence to the time base direction of the period of the horizontal scanning time period. However, for example, the change may be made every a predetermined number of continuous horizontal scanning time periods, e.g., the change may be made every lapse of two horizontal scanning time periods. Even with such a constitution, the luminance difference between the pixel columns per unit time is reduced. Likewise, even when corresponding to the time base direction corresponding to the field period, the appearance pattern of the inversion interval of the horizontal clocks HCK (HCK1 and HCK2) may be changed every a predetermined number of continuous field time periods. That is to say, in terms of the concept of the present invention, after one horizontal scanning time period or one field time period is set as a minimum basic unit, the timing at which the appearance pattern of the inversion interval of the horizontal clocks HCK (HCK1 and HCK2) is changed may be arbitrarily set.

In addition, as can be understood from the description until now, in this embodiment, there is especially no limit to the relationship between the number of horizontal pixels before the conversion and the number of horizontal pixels after the conversion (the number of horizontal pixels of the display panel 3). However, two examples other than the example adopted in this embodiment will now be given.

For example, when the number of horizontal pixels before the conversion is 720, and the number of horizontal pixels after the conversion is 480, a ratio of the former to the latter is 3:2. In this case, the unit time period of 3 mck has to be divided into two driving time periods with 1 mck as a minimum unit. Therefore, the pixels have to be driven based on a combination of 1 mck and 2 mck every unit time period.

In addition, when the number of horizontal pixels before the conversion is 720, and the number of horizontal pixels after the conversion is 560, a ratio of the former to the latter is 9:7. Thus, the unit time period of 9 mck is divided into seven driving time periods with 1 mck as a minimum unit. Therefore, one unit time period, for example, has to be formed on the basis of a combination of 1 mck, 1 mck, 1 mck, 1 mck, 1 mck, 2 mck and 2 mck. In this case, for example, any other suitable combination such as one of 1 mck, 1 mck, 1 mck, 1 mck, 1 mck, 1 mck and 3 mck can be expected.

In addition, in these examples as well, it is possible to readily realize that the time period for writing of the pixel data is unified by utilizing the data enable signal DE, or the horizontal clocks HCK (HCK1 and HCK2) are generated so that the driving time period for one pixel per unit time becomes uniform in accordance with FIG. 6. Thus, the luminance difference between the pixels can be dissolved.

Also, in the description until now, the number of horizontal pixels of 720, and the transfer clock frequency of 13.5 MHz are regulated in accordance with the data interface standard for the video signal data to which this embodiment corresponds. However, as described above, there is especially no limit to the relationship between the number of horizontal pixels before the conversion and the number of horizontal pixels after the conversion. Therefore, even in the present invention, the number of horizontal pixels, the clock frequency and the like which are regulated in accordance with the data interface standard are also not especially limited.

Also, as has been described above, in addition to the liquid crystal display, the organic electro luminescence display or the like is expected as the display panel as well. Thus, there is especially no limit to the kind of display panel. Moreover, the apparatus having the configuration as the display driving signal processor of the present invention includes a display device or the like which is used as a monitor screen in an image pick-up device such as a digital still camera or a video camera in addition to a display apparatus such as a monitoring apparatus or a television image receiver.

It should be understood by those skilled in the art that various modifications, combinations, sub-combinations and alternations may occur depending on designs and other factors insofar as they are within the scope of the appended claims or the equivalents thereof.

What is claimed is:

1. A display driving signal processor, comprising:

input means for inputting video signal data having a predetermined number of first horizontal pixels, and a first clock having a given period and a predetermined frequency corresponding to the predetermined number of first horizontal pixels, the first clock being synchronized with the video signal data;

number-of-horizontal pixels converting means for converting the video signal data inputted by said input means from the number of first horizontal pixels to the number of second horizontal pixels adapted to the number of horizontal pixels which an image displaying portion has;

second clock generating means for generating a second clock in accordance with which an inversion interval is variably set based on a ratio of the number of first horizontal pixels to the number of second horizontal pixels, the second clock being to be synchronized with the video signal data after the number of first horizontal pixels is converted into the number of second horizontal pixels and having the inversion interval having a length which is an integral multiple of one period of the first clock; and output means for outputting data signals in accordance with the second clock and the video signal data after the number of first horizontal pixels is converted into the number of second horizontal pixels to said image displaying portion for displaying thereon an image by performing driving so as to scan pixels disposed in matrix at predetermined timing in horizontal and vertical directions, and writing data signals to the corresponding pixels at timing based on the second clock with respect to the horizontal pixel driving.

2. The display driving signal processor according to claim 1, further comprising adjusting means for adjusting output timing, in pixel data unit, for the video signal data which is obtained after the number of first horizontal pixels is converted into the number of second horizontal pixels and which is outputted from said output means so as to be synchronized with the second clock.

3. The display driving signal processor according to claim 2, further comprising delay means for delaying pixel data in the video signal data which is obtained after the number of first horizontal pixels is converted into the number of second horizontal pixels in accordance with the timing for the second clock.

4. The display driving signal processor according to claim 1, further comprising pixel driving controlling means for performing pixel driving in a horizontal direction in said image displaying portion when a difference exists in a valid time period for writing of data signals per unit time between the pixel columns of said image displaying portion.

5. The display driving signal processor according to claim 4, wherein said pixel driving controlling means controls so that with respect to the longest writing time period for which the data signal writing possible time period based on the second clock becomes the longest one, the valid time period for writing of the data signals becomes equal to the shortest writing time period for which the data signal writing possible time period based on the second clock becomes the shortest one.

6. The display driving signal processor according to claim 5, wherein said pixel driving controlling means generates a data signal output control signal used to stop output of the data signals to the corresponding pixels for the longest writing time period only for a time period obtained by subtracting a time length of the shortest writing time period from a time period of the longest writing time period, and controls output of the data signals from said output means in accordance with the data signal output control signal.

7. The display driving signal processor according to claim 4, wherein said pixel driving controlling means includes said second clock generating means for generating the second clock so that an appearance pattern of the inversion interval of the second clock is changed every lapse of a predetermined time period with one horizontal scanning time period as a minimum basic unit.

8. The display driving signal processor according to claim 4, wherein said pixel driving controlling means includes said second clock generating means for generating the second clock so that an appearance pattern of the inversion interval of the second clock is changed every lapse of a predetermined time period with one field time period as a minimum basic unit.

9. A display apparatus, comprising:

an image displaying portion configured to display thereon an image by performing driving so as to scan pixels disposed in matrix at predetermined timing in horizontal and vertical directions, and writing data signals to the corresponding pixels at timing based on a second clock with respect to horizontal pixel driving;

input means for inputting video signal data having a predetermined number of first horizontal pixels, and a first clock having a given period and a predetermined frequency corresponding to the predetermined number of first horizontal pixels, the first clock being synchronized with the video signal data;

number-of-horizontal pixels converting means for converting the video signal data inputted by said input means from the number of first horizontal pixels to the number of second horizontal pixels adapted to a number of horizontal pixels which an image displaying portion has;

second clock generating means for generating a second clock in accordance with which an inversion interval is variably set based on a ratio of the number of first horizontal pixels to the number of second horizontal pixels, the second clock being to be synchronized with the video signal data after the number of first horizontal pixels is converted into the number of second horizontal pixels and having the inversion interval having a length which is an integral multiple of one period of the first clock; and output means for outputting the data signals in accordance with the second clock and the video signal data after the number of first horizontal pixels is converted into the number of second horizontal pixels to said image displaying portion.

10. A display driving signal processing method, comprising the steps of:

inputting video signal data having a predetermined number of first horizontal pixels, and a first clock having a given period and a predetermined frequency corresponding to the predetermined number of first horizontal pixels, the first clock being synchronized with the video signal data;

converting the video signal data inputted in said inputting step from the number of first horizontal pixels to the number of second horizontal pixels adapted to the number of horizontal pixels which an image displaying portion has;

generating a second clock in accordance with which an inversion interval is variably set based on a ratio of the number of first horizontal pixels to the number of second horizontal pixels, the second clock being to be synchronized with the video signal data after the number of first horizontal pixels is converted into the number of second horizontal pixels and having the inversion interval having a length which is an integral multiple of one period of the first clock; and outputting data signals in accordance with the second clock and the video signal data after the number of first horizontal pixels is converted into the number of second horizontal pixels to said image displaying portion for displaying thereon an image by performing driving so as to scan pixels disposed in matrix at predetermined timing in horizontal and vertical directions, and writing data signals to the corresponding pixels at timing based on the second clock with respect to the horizontal pixel driving.

11. A display driving signal processor, comprising:

an input section configured to input video signal data having a predetermined number of first horizontal pixels, and a first clock having a given period and a predetermined frequency corresponding to the predetermined number of first horizontal pixels, the first clock being synchronized with the video signal data;

a number-of-horizontal pixels converting section configured to convert the video signal data inputted by said input section from the number of first horizontal pixels to the number of second horizontal pixels adapted to the number of horizontal pixels which an image displaying portion has;

a second clock generating section configured to generate a second clock in accordance with which an inversion interval is variably set based on a ratio of the number of first horizontal pixels to the number of second horizontal pixels, the second clock being to be synchronized with the video signal data after the number of first horizontal pixels is converted into the number of second horizontal pixels and having the inversion interval having a length which is an integral multiple of one period of the first clock; and an output section configured to output data signals in accordance with the second clock and the video signal data after the number of first horizontal pixels is converted into the number of second horizontal pixels to said image displaying portion for displaying thereon an image by performing driving so as to scan pixels disposed in matrix at predetermined timing in horizontal and vertical directions, and writing data signals to the corresponding pixels at timing based on the second clock with respect to the horizontal pixel driving.

* * * * *